United States Patent [19]
Bandy, Jr. et al.

[11] Patent Number: 5,389,044
[45] Date of Patent: Feb. 14, 1995

[54] SPLIT SPROCKET AND RETAINER ASSEMBLY

[75] Inventors: Clarence L. Bandy, Jr., Glade Spring; Gregory W. Smith, Bristol, both of Va.

[73] Assignee: American Longwall Face Conveyors, Inc., Abingdon, Va.

[21] Appl. No.: 82,191

[22] Filed: Jun. 24, 1993

[51] Int. Cl.⁶ ............................................. F16H 55/12
[52] U.S. Cl. ...................... 474/96; 474/903; 474/152; 74/450
[58] Field of Search ............. 474/95, 96, 152, 161, 474/903; 74/89.21, 89.22, 450

[56] References Cited

U.S. PATENT DOCUMENTS

| 435,160 | 8/1890 | Stoddard | 474/96 |
|---|---|---|---|
| 2,312,760 | 3/1943 | Heidegger | 474/903 X |
| 2,429,008 | 10/1947 | Wolfe . | |
| 3,082,637 | 3/1963 | Paxton | 74/450 X |
| 3,220,273 | 11/1965 | Christian . | |
| 3,319,413 | 5/1967 | Costner | 74/450 X |
| 3,501,972 | 3/1970 | Morrow et al. . | |
| 3,685,367 | 8/1972 | Dawson . | |
| 3,789,687 | 2/1974 | Cutter | 474/152 |
| 4,037,713 | 7/1977 | Soliman et al. . | |
| 4,043,214 | 8/1977 | Westlake . | |
| 4,049,112 | 9/1977 | Tyslauk | 74/450 X |
| 4,140,413 | 2/1979 | Conrad | 474/903 X |
| 4,506,559 | 3/1985 | Francke et al. | 474/95 X |
| 4,631,974 | 12/1986 | Wiegand et al. | 474/903 X |
| 4,711,635 | 12/1989 | Arnce | 474/152 |
| 4,998,905 | 3/1991 | Martin | 474/42 |
| 5,035,681 | 7/1991 | Hertel et al. | 474/161 X |
| 5,057,058 | 10/1991 | Crudup | 474/95 |

Primary Examiner—Roger J. Schoeppel
Attorney, Agent, or Firm—King & Schickli

[57] ABSTRACT

A split sprocket and retainer assembly are provided for mounting on the drive shaft of a chain drive system, such as a conveyor drive system. The sprocket is split diametrically into two sections and includes a hub. Cross fixing bolts across the hub secure the two sprocket sections together on the drive shaft. A one-piece retaining ring is positioned over the sprocket hub in snug engagement, and overlying the bolts. The retaining ring absorbs the thrust force generated by the driving torque tending to radially separate the sprocket sections during operation of the drive system. A split outer retainer collar is mounted so as to abut the retaining ring and to secure it in position against axial shifting and backing off the hub.

16 Claims, 3 Drawing Sheets

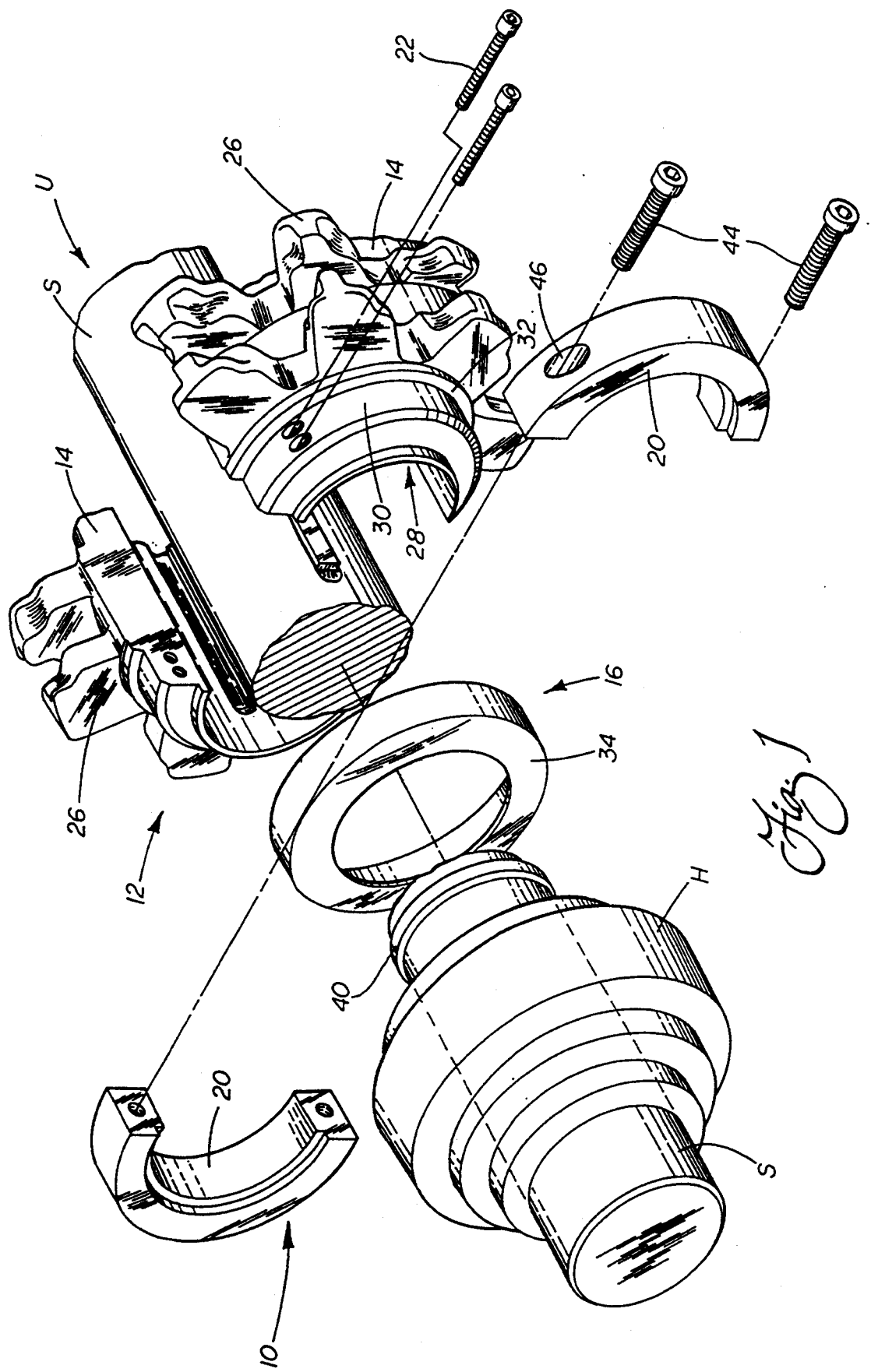

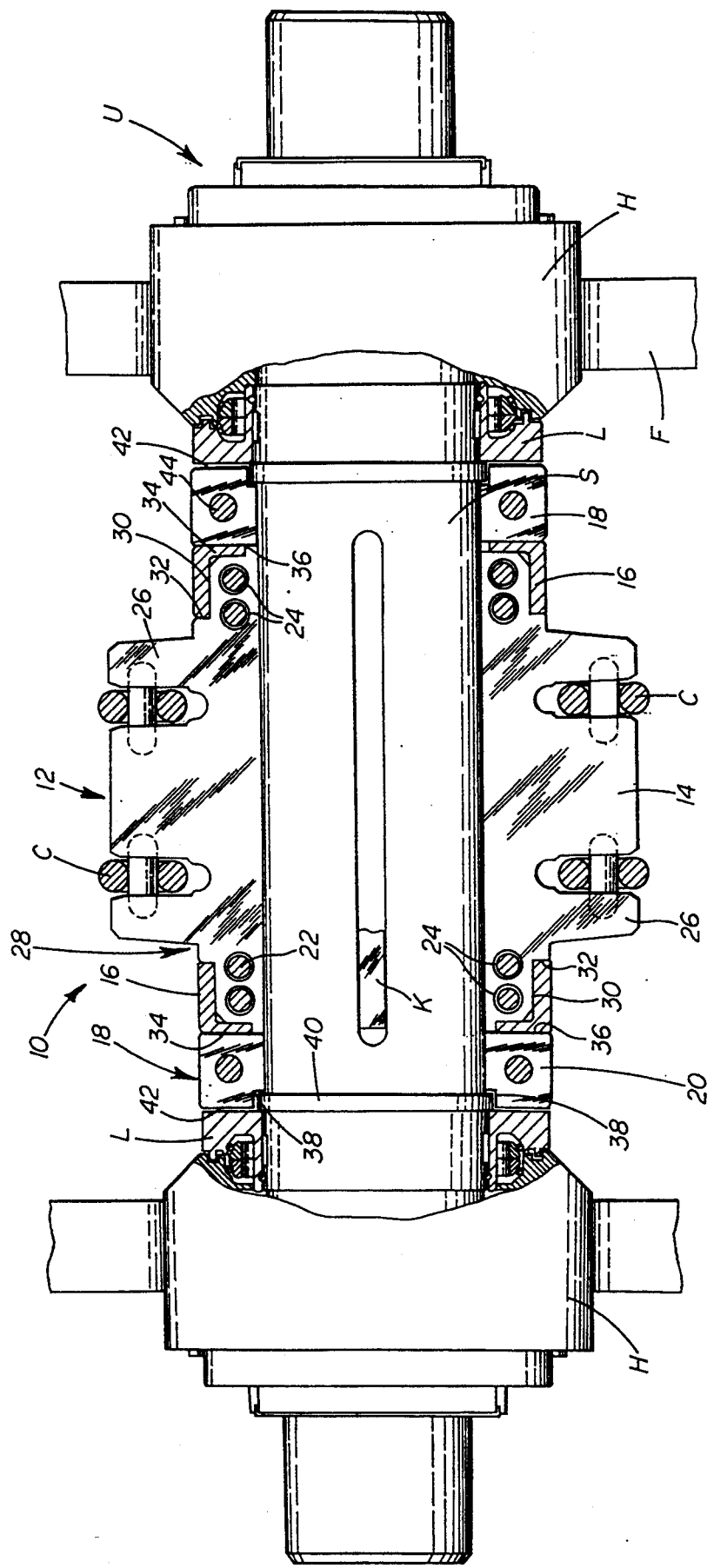

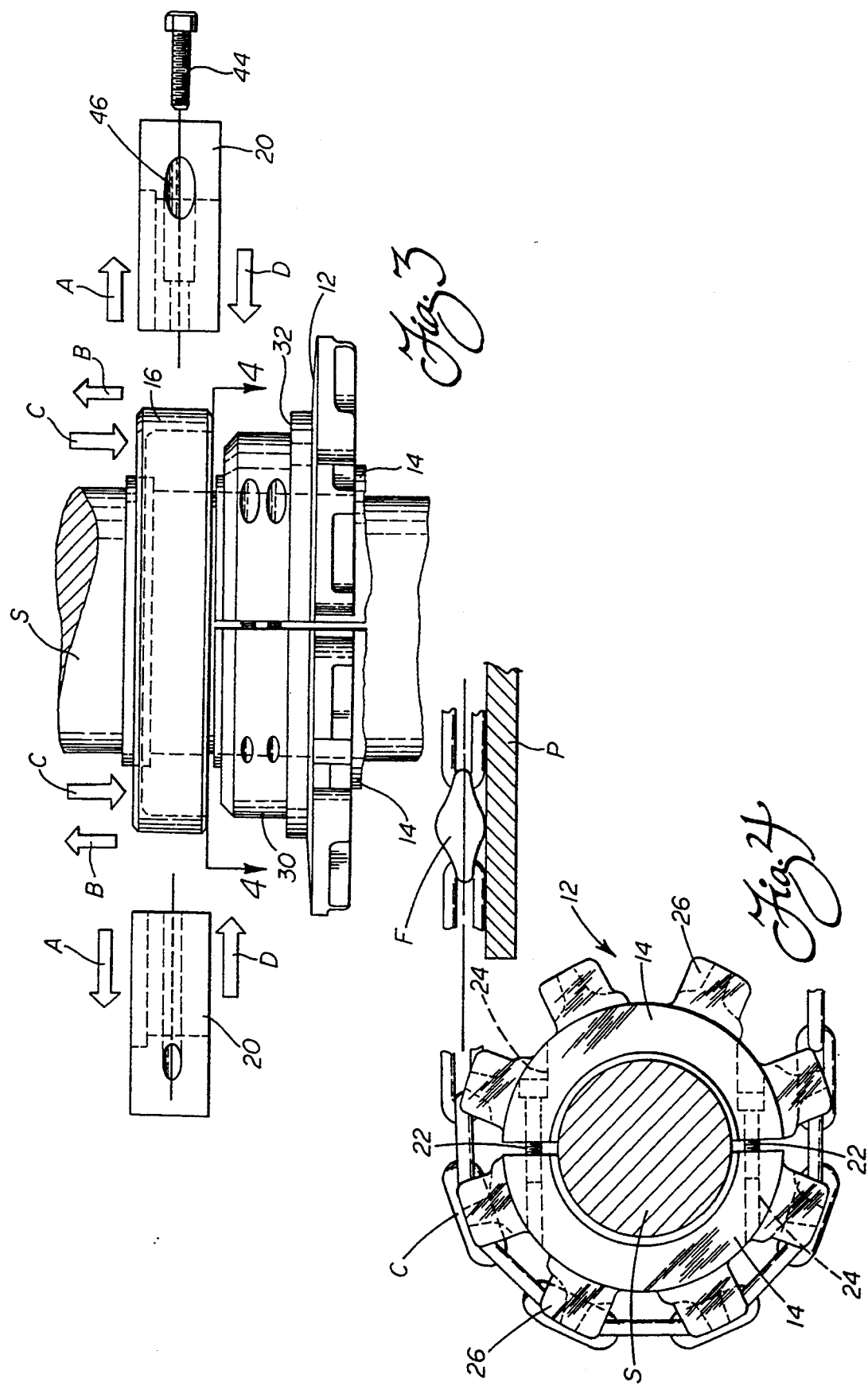

SPLIT SPROCKET AND RETAINER ASSEMBLY

TECHNICAL FIELD

The present invention relates generally to rotary drive systems for machinery and, more particularly, to an improved split sprocket and retainer assembly for heavy equipment, such as an armored face conveyor.

BACKGROUND OF THE INVENTION

Sprockets are an integral component of many heavy-duty equipment and machinery drive systems including those of conveyors, such as armored face conveyors and beam stage loaders used in underground mining of coal. By definition, such sprockets include a series of spaced teeth for engaging the sequential horizontal links of a chain being driven. Most often in this specific application, the sprocket accommodates dual, side-by-side chains. Each chain is captured between two contoured inside surfaces forming the teeth of the driving interface.

While such a rotary drive system has proven to be efficient and effective for this purpose, rapid wear of the teeth can be a serious problem. This wear primarily results from the harsh operating environment of mining equipment. Heavy loading, relatively high operating speeds and the presence of particulate matter, including coal fines, sand and small rock particles, trapped at the driving interface between the sprocket teeth and chain, causes the accelerated wear.

In order to facilitate repair/replacement of a worn or damaged sprocket, it has long been known to utilize a sprocket of split design. Such sprockets are typically split diametrically into two sections. This facilitates removal from the drive shaft, and replacement with a new sprocket. The split configuration of the sprocket eliminates the need to free one end of the drive shaft from the bearings for slipping the sprocket on and off over the end of the shaft. An example of such a split sprocket design is shown in, for example, the U.S. Pat. No. 4,037,713 to Soliman et al. Another known arrangement is where a split retainer assembly is used, such as shown in the U.S. Pat. No. 3,685,367 to Dawson. However, in this instance releasable stub shafts, or other arrangements must be made to remove the sprocket.

In these patents, the split sprocket or collar sections are retained on the drive shaft solely by means of cross fixing bolts mounted in the typical pattern transverse to the shaft axis. While such a fastening mechanism allows for proper and dependable operation for many light to medium duty applications, it leaves much to be desired insofar as providing the necessary strength to handle the torque generated radial thrust loads that may be anticipated to occur during certain heavy duty conveyor applications, or related rotary drive operations.

For example, the cross fixing bolts are in some instances simply not strong enough to continuously handle the torque/thrust loads required to transmit high horsepower, especially on some extended length armored face conveyors or beam stage loaders. Specifically, over time the bolts have a tendency to work loose or undergo metal stretch and/or fatigue. Either of these conditions can cause the sprocket and retainer assembly to slip on the drive shaft and eventually fail before being noticed by operating personnel. Not only must the sprocket then be replaced, but the failure also often causes the destruction of the driving key and/or damage to the drive shaft. The resulting necessary repairs to these structures significantly increases the downtime of the equipment. Of course, the replacement parts and the labor costs for repair are also increased. Thus, it should be appreciated that this is an area where innovation would be highly beneficial, and substantial money savings could be realized.

Other designs for retainer assemblies for holding together split rotary drive units are disclosed in U.S. Pat. Nos. 3,220,273 to Christian and 4,506,559 to Francke et al. In Christian, the sprocket is divided into two halves, with the dividing line extending in the plane of travel of the chain. A one-piece retaining ring is positioned between the two halves to hold the split sprocket sections together in the radial direction. A split retaining ring must be bolted to the hub supporting the sprocket halves to prevent axial displacement of the sprocket sections, and thus hold the entire unit together. While this design provides more reliable operation and better dissipation of the forces tending to pull the sprocket sections radially apart during machinery operation, it should be appreciated that the sprocket is weakened by having to be split into two halves. Also, the removal and replacement of the sprocket halves requires a tedious disassembly operation, including the removal of a large number of relatively small bolts. These same bolts must then be reinstalled during reassembly when the retaining ring is reattached to the hub of the sprocket. The installation of these relatively large number of bolts in the proper sequence, and then tightening to the proper torque setting, is a time consuming task. In addition, this retainer assembly also requires a shear pin to be installed. Dealing with these many, relatively small parts simply adds to the tedium and difficulty of replacement. Hence, repair and replacement is inconvenient, requiring significant labor expense and equipment downtime, negatively impacting productivity.

In Francke et al '599 patent, raised lateral segments are provided on split sections. These segments fit into cooperating grooves formed in disk-shaped, outer flanges that secure the assembly together. Once again, while this design may provide suitable force dissipation in light-to-medium duty pulley applications, it would not be suitable for use in heavy duty mining conveyor sprocket applications. The desired maximum strength of connection of the sections is clearly not achieved to allow full dissipation of anticipated, heavy duty forces, such as encountered during armored face conveyor operation. The segments fitting into the grooves incorporate an inherently weak shear coupling design. The presence of this teaching in a recent patent of using a shear coupling to connect a split rotary drive unit, simply reinforces the need for innovation and improvement in this area.

SUMMARY OF THE INVENTION

Accordingly, it is a primary object of the present invention to provide a split drive unit including a split driving member and retainer assembly for a rotary drive system. The drive unit is of relatively simple and inexpensive construction, but provides dependable, heavy-duty performance over a long service life. Advantageously, this is accomplished while also allowing convenient and efficient repair/replacement of the drive unit as may be required as a result of normal wear.

Yet another object of the present invention is to provide a unique rotary drive unit, such as a split sprocket and retainer assembly, for heavy-duty machinery, particularly adapted for armored face conveyors or the like. The sprocket and retainer assembly may be readily retro-fitted to equipment in the field thereby enhancing the performance, reliability and productivity of existing equipment.

Yet a further object of the present invention is to provide a rotary drive unit, such as split sprocket and retainer assembly, characterized by increased strength to absorb/dissipate radial thrust forces generated by driving torque tending to radially separate the sprocket sections during machinery operation. As a result, failures of the drive unit prevalent in prior art split designs leading to damage to the key and/or drive shaft are significantly reduced or avoided.

Still another object of the present invention is to provide a split sprocket and retainer assembly including a convenient cross bolt fixing system to conveniently hold the sprocket sections in place on the drive shaft during installation with a retaining collar that resists radial separation of the sprocket sections during machinery operation. This design significantly assists maintenance personnel during the installation and repair process. As a result of the time and effort saved, labor costs are reduced and productivity is increased.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved split drive unit for a rotary machinery drive system is provided. The drive unit may comprise a driving member, such as a sprocket that is split, substantially diametrically, into two sections. A retainer assembly includes at least one one-piece retaining ring positioned over the end of the hub of the supporting driving member or sprocket sections when joined about a drive shaft. This one piece retaining ring that is L-shaped in cross section is of sufficient strength to absorb or dissipate the forces tending to radially separate the sprocket sections during operation of the machinery drive system.

Preferably, a retaining ring is positioned at each end of the drive unit to maintain both ends secure against separation and to complete the basic driving member, and preferably sprocket and retainer assembly. This arrangement demonstrates the ability to dissipate the radial thrust loads on a drive sprocket generated by the large torque forces required to transmit high horsepower on armored face conveyors or beam stage loaders. The high loading is especially prevalent when initiating operation of the conveyor and breaking inertia of the system.

An outer split retainer collar is mounted so as to abut the one-piece retaining ring and prevent the retaining ring from shifting axially along the shaft and backing-off the hub. In this way, the retaining ring is maintained in position to hold the split sprocket sections together under substantially any anticipated operating conditions.

More preferably, the assembly may also include fasteners for securing the sprocket sections together prior to installation of the one-piece retaining ring. Specifically, cross-fixing bolts threaded into one section may be utilized to hold the sprocket sections in position and securely keyed to the drive shaft. This additional connection serves to conveniently hold the sprocket sections together initially, thereby significantly simplifying the proper installation of the retaining ring. The retaining ring is simply force fitted over the hub of the mating sprocket sections onto a slightly tapered seat and against a locating shoulder machined in the hub. As such, the assembly process is significantly simplified, and installation time, and thus equipment down time, are greatly reduced to the benefit of the machinery operator.

Still more specifically, the one-piece retaining ring has its longer flange or leg of a substantially L-shaped cross section extending axially, so as to more firmly seat on the hub and against the locating shoulder. Additionally, this L-sectional design, because it includes a transverse flange or leg extending radially inwardly, substantial additional strength is provided to the retaining ring. This added strength resists stretching in a superior manner, simply because the flange extends substantially perpendicular to the longitudinal axis of the drive shaft, and thus in the direction of the torque induced radial thrust. This flange fits in juxtaposition to the outer retainer collar to better secure the retaining ring in proper axial position on the hub.

For ease of assembly and disassembly, it should also be appreciated that the outer retainer collar provides a significant contribution. Specifically, the collar is split substantially diametrically into two segments that may be quickly positioned around the drive shaft and connected together by means of cross fixing bolts, or other fasteners. As the outer collar is only subjected to resisting the axial translation of the retaining collar relative to the sprocket hub, that is axial compression between the retaining ring and an integral shoulder on the shaft, the bolts have sufficient strength to withstand this relatively low force loading without working loose or stretching. Accordingly, the split outer collar design with the cross fixing bolts provides the advantages of being quickly releasable, but does not adversely affect the strength, durability and performance of the overall drive unit.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 1 is an exploded perspective view showing a drive unit including one end of a split sprocket and retainer assembly of the preferred embodiment of the present invention, as well as the drive shaft of a machinery rotary drive system;

FIG. 2 is a partial cross-sectional view showing a complete dual split sprocket and retainer assembly installed on the drive shaft;

FIG. 3 is a detailed, exploded side view illustrating the key steps in replacement of the sprocket and retainer assembly; and FIG. 4 is a cross sectional view along line 4—4 of FIG. 3 showing the mounting of the split sprocket on the drive shaft prior to installing the retainer assembly.

Reference will now be made in detail to the present preferred embodiment of the invention, an example of which is illustrated in the accompanying drawing.

DETAILED DESCRIPTION OF THE INVENTION

Reference is now made to FIG. 1 showing the split sprocket and retainer assembly 10 of the present invention for mounting on a drive shaft S of a rotary drive unit, such as chain drive system for heavy equipment. As will be described in greater detail below, the assembly 10 includes a sprocket 12 diametrically split into two sections 14, a one-piece retaining ring 16 and an outer retainer collar 18 diametrically split into two sections 20 or segments. One retaining ring 16 and one outer retainer collar 18 are provided at each end of the split sprocket 12 to hold the sprocket 12 in the proper operating position.

The present invention is being described for purposes of illustration with reference to a rotary drive unit U of an armored face conveyor (see FIG. 2). Such a drive unit U includes a drive shaft S supported at each end by means of bearings held in bearing housings H on a frame F. The drive shaft S is rotatably driven by means of a motor (not shown), or may be a shaft driven by a sprocket.

In accordance with this preferred embodiment, the sprocket 12 includes a series of teeth 26 for driving a chain C of the armored face conveyor (see FIGS. 2 and 4). Specifically, the teeth 26 have opposed profiled teeth that engage the horizontal links of the chain C. As is known in the art, flight F is also mounted on the horizontal links of the chain to move coal or other material being mined along the conveyor pan P (see FIG. 4) during conveyor operation. Equally applicable to the use of the split sprocket and retainer assembly is a beam stage loader or other type of conveyor. As will be realized, other rotary drive units utilizing a different form of driving member, but where heavy duty operation and easy assembly/disassembly is desired, can benefit from the teachings of the invention.

The sprocket 12 is mounted on the drive shaft S between the bearing housings H. Specifically, the two sprocket sections 14 are aligned and placed over and around the drive shaft S. Two keys K (only one shown in FIG. 2), located 180° apart on the drive shaft S engage the sprocket sections 14 and secure them for rotation with the drive-shaft S. Fasteners, such as bolts (eight in all), are utilized to hold the sprocket sections 14 together. Specifically, a bolt 22 is threaded and engages each of the aligned and cooperating threaded apertures 24 in opposed sprocket section 14. Each bolt 22 is snugly tightened down to the proper torque setting to initially secure the sprocket 12 in position on the drive shaft S (see also FIG. 4).

During operation of an armored face conveyor substantial radial thrust loads generated by the drive torque of the unit are placed upon the sprocket 12. Specifically, these loads result from the transmission through the sprocket 12 of the large torque necessary to provide the conveyor operation. It has been found in the past that the use of the cross fixing bolts 22 alone (the type of bolts just described), are simply not strong enough to handle the thrust loads to which such sprocket sections 14 are subjected.

Specifically, over time the bolts tend to work loose, undergo metal fatigue and/or stretch. This condition eventually results in the slipping of the sprocket 12 on the drive shaft S, and thus conveyor failure. In many cases the failing sprocket 12 shears the key K and/or damages the drive shaft S necessitating further extensive repairs (e.g. even drive shaft and bearing replacement). Significant downtime resulting in crucial lost productivity of the coal being mined is very costly to the mine operator when this happens.

In order to solve this problem, the present invention provides a unique solution that includes a one-piece retaining collar 16 to relieve the radial stress load on the bolts 22. As shown, the one-piece retaining ring 16 is positioned over the hub 28 formed by the joined sprocket sections 14. In the complete assembly of the drive unit 10, a retaining ring 16 of the type being described is provided at each end of the sprocket 12 (see FIG. 2).

More specifically, each retaining collar 16 is substantially L-shaped in section. Each retaining ring 16 is specially adapted to mate with a seat 30 machined on the hub 28 and to engage a locating shoulder 32. This arrangement axially positions the ring 16, and abutment against the shoulder 32 is useful for visually indicating proper positioning to maximize resisting the forces of separation of the sprocket sections 14.

Preferably, the seat 30 is tapered slightly to simplify both installation and removal of the retaining collar 16. Further, it should be appreciated that the retaining ring 16 is machined to provide a press fit on the seat 30; i.e. a fit of very close tolerance is provided. Thus, stress normally placed on the bolts 22 during machinery operation that tends to separate the sprocket sections 14 is substantially removed from the bolts 22 and dissipated by the retaining collar.

Advantageously, the L-shaped sectional design provides additional strength to the retaining ring 16. To explain, the long leg of the ring 16 in cross section provides the primary separation resistance and also encompasses and fully encloses the seat 30. As such, the ring 16 also captures the bolts 22 and prevents them from backing out and becoming loose (see FIG. 4). Further, a radial flange 34 is provided to form the other leg of the ring 16, and advantageously this annular flange 34 extends substantially perpendicular or transverse to the longitudinal axis of the drive shaft S. The strength of the ring 16 is greatly enhanced by the transverse flange 34, not only through the overall rigidity of the ring 16 being increased, but also since stretching or ballooning of the ring is effectively prevented. This flange 34 is engaged by the outer retainer collar 18. This positioning secures the retaining ring 16 in the proper axial position at all times, thus preventing the ring from backing off the hub 28 during conveyor operation.

To more fully explain, after fully seating the retaining ring 16 on the hub 28, the segments 20 of the retainer collar 18 (see FIGS. 1 and 3) are joined together around the drive shaft S (see FIG. 2). The inner face 36 of each outer collar section 20 is placed in juxtaposition with the annular flange 34 of the associated retaining collar 16. At the same time, an annular recess 38 in the collar sections 20 engages a shoulder 40 formed integrally on the drive shaft S. Additionally, when the annular recess 38 and shoulder 40 are engaged, thus locking the sprocket 12 axially in position, it should be appreciated that the outer face 42 of the retainer collar 18 just clears the seal L of the bearing housing H (see FIG. 2).

The collar sections 20 are held together by a releasable means, such as cross fixing bolts 44. Specifically, as best shown in FIG. 1, the bolt head is received in the cooperating aperture 46 in one of the collar sections 20 and threadingly engages the other to hold the sections together. As the entire purpose of the outer collar 18 is to prevent axial displacement of the flanged retaining ring 16 relative to the sprocket hub 28 and drive shaft S, relatively low loads are placed upon it. There are no thrust loads generated by driving torque, as is experienced by the sprocket 12. Thus, the simple cross fixing bolts 44 provide the necessary strength to maintain the strength and integrity of the split sprocket and retainer assembly 10 under substantially any anticipated operating conditions of the rotary drive unit U for a conveyor or similar application.

An important advantage of the present invention resides in the utilization of the one-piece, flanged retaining ring 16. Specifically, this ring 16 is of sufficient strength and rigidity to absorb or dissipate the forces tending to radially separate the sprocket sections 14 during operation of the chain drive system. This includes the anticipated high thrust loads occurring when, for example, an armored face conveyor of extended length is being employed, breaking inertia and initiating operation of a conveyor system or loosening conveyor jams. The ring 16 is assured to staying in place by the simple expedient of the split ring collar 18, which is subjected only to low level axial loading.

An additional advantage of the present invention resides in the relatively simple procedure required to replace the sprocket 12 when it becomes worn. Specifically, as best shown with reference to FIG. 3, assuming the chain C is removed, the two bolts 44 are released from the outer retainer collar 18. The collar sections 20 are then pulled apart and removed from the drive shaft S (see action arrows A). Next, the retaining ring 16 is pulled off the tapered seat 30 of the sprocket hub 28 into the area of the drive shaft S previously occupied by the collar 18 (see action arrow B). The cross fixing bolts 22 are then removed from the sprocket 12. The process is repeated to similarly release the flanged ring 16 at the opposite end (see FIG. 2). The sprocket sections 14 are now free to be separated and removed from the drive shaft S.

Next, the new sprocket sections 14 are joined around and initially positioned in proper position on the drive shaft S and the bolts 22 tightened. The bolting step is of substantial benefit to the installer, since the sprocket 12 is secured in position in readiness for installation of the flanged retaining ring 16 which is then forced back over the hub 28 at one end (see action arrows C). Once the retaining ring 16 is fully seated, the outer collar sections 20 are positioned over the drive shaft S with the inner faces 36 abutting the flange 34 of the retaining ring, and the annular recess 38 is positioned so as to be engaging the drive shaft shoulder 40 (see action arrows D). The cross fixing bolts 44 are then placed in the apertures 46 and the outer collar sections 20 are tightened together to secure and complete the collar 18. The opposite end of the sprocket 12 is then secured in the same manner. The drive chain C is then reengaged in the sprocket 12 and the overall conveyor drive unit U is again readied for operation.

In summary, numerous benefits result from employing the concepts of the present invention. The split sprocket and retainer assembly 10 includes a convenient cross fixing bolt arrangement to hold the sprocket sections 14 together on the drive shaft S. Special flanged retaining rings 16 are employed on the hub 28 of the sprocket 12. Advantageously, the retaining collar 16 has sufficient strength to better dissipate or absorb the thrust forces tending to radially separate the sprocket sections 14 during machinery operation. Accordingly, more reliable and dependable operation under substantially all anticipated operating conditions is provided. Further, it should be appreciated that the assembly 10 is particularly adapted to allow relatively simple, quick repair and replacement of sprocket 12, and may be relatively easily retrofitted to equipment in the field to provide a significant benefit of machinery operators.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with breadth to which they are fairly, legally and equitably entitled.

We claim:

1. A split driving member and retainer assembly for mounting on a drive shaft of a rotary drive unit, comprising:

a driving member including a hub and being split substantially diametrically into two sections;
   means for cross-fixing said sections together;
   means for connecting said hub of the driving member to said shaft;
   a one-piece retaining ring positioned over the end of said hub to join said sections when mounted on said shaft, said one-piece retaining ring absorbing thrust forces tending to radially separate said sections during operation of said drive unit, said one-piece retaining ring being operative to retain said cross-fixing means in a plane substantially transverse to the axis of said drive shaft;
   an outer retainer collar mounted on said shaft so as to axially abut said one-piece retaining ring to prevent said ring from shifting axially along said hub and said drive shaft; and
   releasable means for connecting said retainer collar to said shaft,
   whereby said split driving member is securely retained and connected to said shaft during operation, but easily removable for replacement.

2. The split driving member and retainer assembly set forth in claim 1, wherein said hub further includes a tapered seat and a locating shoulder for receiving and engaging said one-piece retaining ring.

3. The split driving member and retainer assembly set forth in claim 1, wherein said one-piece retaining ring is substantially L-shaped in cross section including an annular flange extending over the end of said hub and said cross-fixing means in a plane substantially transverse to the axis of said drive shaft.

4. The split driving member and retainer assembly set forth in claim 1, wherein said outer retainer collar is split substantially diametrically into two segments and said releasable means includes at least one cross bolt on each side of said collar.

5. The split driving member and retainer assembly set forth in claim 4, wherein said outer retainer collar includes an annular recess, and a shoulder on the drive shaft engaging said recess to thereby resist axial displacement along said drive shaft.

6. A driving sprocket and retainer assembly for mounting on a drive shaft of a heavy duty rotary drive unit including a drive chain, for an armored face conveyor or the like, comprising:
   a driving sprocket including a hub and being split substantially diametrically into two sections;
   means for cross-fixing said sections together;
   means for connecting said hub of the driving sprocket to said shaft;
   a one-piece retaining ring positioned over the end of said hub to join said sections when mounted on said shaft, said one-piece retaining ring absorbing thrust forces tending to radially separate said sections during operation of said conveyor, said one-piece retaining ring being operative to retain said cross fixing means in a plane substantially transverse to the axis of said drive shaft;
   an outer retainer collar mounted on said shaft so as to axially abut said one-piece retaining ring to prevent said ring from shifting axially along said hub and said drive shaft; and
   releasable means for connecting said retainer collar to said shaft,
   whereby said split driving sprocket is securely retained and connected to said shaft during operation but easily removable for replacement.

7. The split driving sprocket and retainer assembly set forth in claim 6, wherein said hub includes two ends mounted on said drive shaft;
   and wherein said retainer assembly includes a one-piece retaining ring and an outer retainer collar on each end of said hub.

8. The split driving sprocket and retainer assembly set forth in claim 7, wherein said sprocket includes spaced teeth for driving dual chains for said conveyor.

9. The split driving sprocket and retainer assembly set forth in claim 6, wherein said hub further includes a tapered seat and a locating shoulder for receiving and engaging said one-piece retaining ring;
said retaining ring having a press fit on said seat.

10. The split driving sprocket and retainer assembly set forth in claim 6, wherein said one-piece retaining ring is substantially L-shaped in cross section including an annular flange extending over the end of said hub and said cross-fixing means in a plane substantially transverse to the axis of said drive shaft.

11. The split driving sprocket and retainer assembly set forth in claim 6, wherein said outer retainer collar is split substantially diametrically into two segments and said releasable means includes at least one cross bolt on each side of said collar.

12. The split driving sprocket and retainer assembly set forth in claim 11, wherein said outer retainer collar includes an annular recess, and a shoulder on the drive shaft engaging said recess to thereby resist axial displacement along said drive shaft.

13. The split driving sprocket and retainer assembly set forth in claim 6, wherein said means for cross fixing said sections comprises at least one cross bolt on each side of the hub of said driving sprocket.

14. A split driving ember and retainer assembly for mounting on a drive shaft of a rotary drive unit, comprising:
   a driving member including a hub and being split substantially diametrically into two sections;
   means for connecting said hub of the driving member to said shaft;
   a one-piece retaining ring positioned over the end of said hub to join said sections when mounted on said shaft, said one-piece retaining ring absorbing thrust forces tending to radially separate said sections during operation of said drive unit;
   an outer retainer collar mounted on said shaft so as to axially abut said one-piece retaining ring to prevent said ring from shifting axially along said hub and said drive shaft;
   said outer retainer collar being split substantially diametrically into two segments and releasable means for connecting said retainer collar to said shaft and including at least one cross bolt on each side of said collar,
   whereby, said split driving member is securely retained and connected to said shaft during operation, but easily removable for replacement.

15. The split driving member and retainer assembly set forth in claim 14, wherein said outer retainer collar includes an annular recess, and a shoulder on the drive shaft engaging said recess to thereby resist axial displacement along said drive shaft.

16. The split driving sprocket and retainer assembly set forth in claim 15, further including means for cross-fixing said sections together prior to installation of said one-piece retaining ring.

* * * * *

UNITED STATES PATENT AND TRADEMARK OFFICE
CERTIFICATE OF CORRECTION

PATENT NO. : 5,389,044
DATED : February 14, 1995
INVENTOR(S) : Clarence L. Bandy, Jr., et. al.

It is certified that error appears in the above-indentified patent and that said Letters Patent is hereby corrected as shown below:

Column 10, claim 14, line 22, change "ember" to --member--.

Signed and Sealed this

Ninth Day of May, 1995

Attest:

BRUCE LEHMAN

*Attesting Officer*                *Commissioner of Patents and Trademarks*